E. SEIGNOL.
INDICATING DEVICE.
APPLICATION FILED JAN. 9, 1920.

1,391,279.

Patented Sept. 20, 1921.

Inventor.
Edouard Seignol
by
Chas. J. O'Neill
Atty.

UNITED STATES PATENT OFFICE.

EDOUARD SEIGNOL, OF NEUILLY, FRANCE.

INDICATING DEVICE.

1,391,279.  Specification of Letters Patent.  Patented Sept. 20, 1921.

Application filed January 9, 1920. Serial No. 350,272.

*To all whom it may concern:*

Be it known that I, EDOUARD SEIGNOL, a citizen of the Republic of France, residing at Neuilly, Department of the Seine, in France, have invented certain new and useful Improvements in or Relating to Indicating Devices, of which the following is a specification.

This invention relates to indicating devices of the kind provided with a main movable indicating element such as a pointer and a second indicating element (hereinafter termed the maximum pointer) which is capable of being moved by the main pointer and retained in any position to which it is moved thereby, thus enabling the maximum movement of the main pointer to be determined.

In such indicating devices heretofore employed the maximum pointer receives its movement from the main pointer and is generally retained in its shifted position by friction.

According to the present invention, the maximum pointer which is made of magnetic material is adapted to be moved relatively to the poles of a permanent magnet or magnets of appropriate form which serve to hold the said pointer with very slight friction, the arrangement being such that the permanent magnets will only exert the degree of attraction necessary for thus holding the pointer.

In order that the said invention may be clearly understood and readily carried into effect the same will now be described more fully with reference to the accompanying drawing, in which:—

Figure 1:
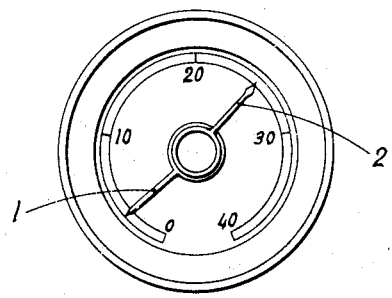
Figure 1 is a front elevation showing the dial and relative parts of one form of indicating device to which the invention may be applied.
Figure 2:
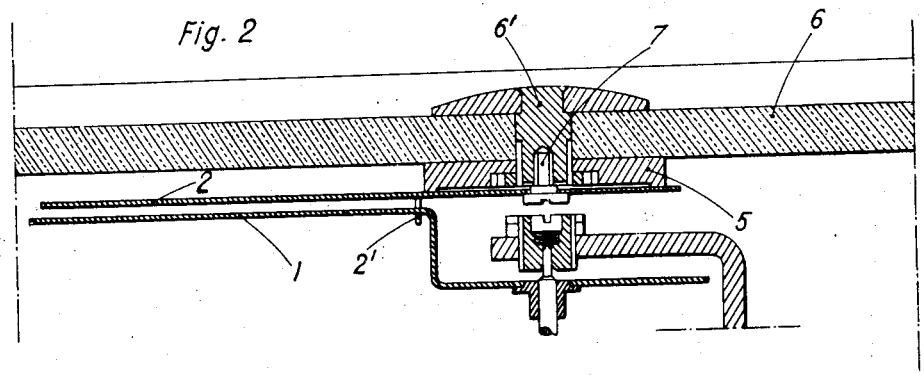
Fig. 2 is a fragmental longitudinal sectional view of a tachometer embodying the invention.
Figure 3:
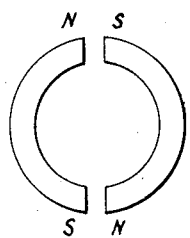
Figs. 3, 4 and 5 show by way of example alternative forms of permanent magnets which may be employed.
Figure 4:
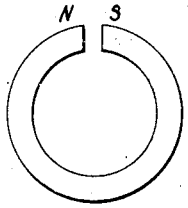
Figure 5:
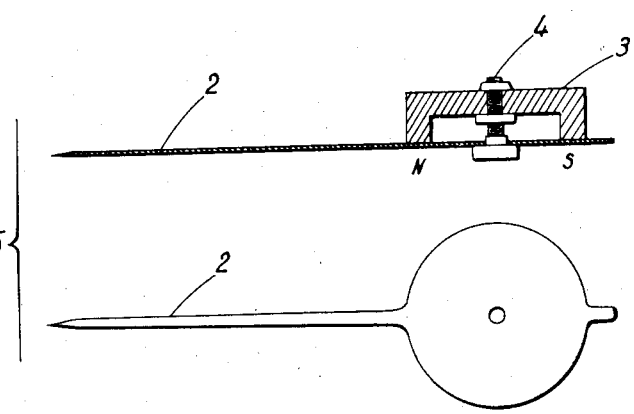

1 denotes the main pointer and 2 the maximum pointer, the latter being adapted to be moved by the main pointer 1 and to remain at the extreme point of its travel when the main pointer returns. As shown in Fig. 2, the maximum pointer 2 is constrained to move in one direction through the medium of a projection 2' secured to the maximum pointer 2 in the usual way. 5 denotes the magnet relatively to which the maximum pointer moves, the said magnet being secured to the glass front 6 of a tachometer by means of a preferably bronze pin 6' and relative connections. The maximum pointer 2 is adapted to be moved about a small pivot pin 7 which as shown in Fig. 2 is in screw-threaded engagement with the inner end of the pin 6'. The magnet 5 (Fig. 2) may for example be of the circular form shown in Fig. 3 or Fig. 4. A slightly modified form of magnet of channel-shape is shown in Fig. 5. In all cases, the form of the maximum pointer, which might be made hollow should satisfy the condition of closing the magnetic circuit, whatever may be its position relatively to the magnet. It may therefore be of flat, cylindrical or any other suitable form, the flat form shown in plan in Fig. 5 being only illustrated by way of example. In the drawing, the poles of the magnets are denoted by the usual reference characters N and S.

Claims:

1. An indicating device, comprising an indicator hand, a maximum pointer adapted to be moved with said indicator hand, and a permanent magnet in contact with said maximum pointer for maintaining the pointer in its maximum position, that portion of the maximum pointer in contact with the magnet being disk-shaped and the axis on which the pointer revolves passing through the center of the disk.

2. An indicating device, comprising an indicator hand, a maximum pointer adapted to be moved with said indicator hand, and a permanent magnet, circular in shape, in contact with said maximum pointer for maintaining the pointer in its maximum position, that portion of the maximum pointer coöperating with the magnet being disk-shaped to correspond with the shape of the magnet, and the axis on which said pointer revolves passing through the centers of said disk and magnet.

3. An indicating device, comprising an indicator hand, a maximum pointer adapted to be moved with said indicator hand in one direction, and a substantially flat, permanent magnet, circular in shape, in contact with said maximum pointer for maintaining the pointer in its maximum position, that portion of the maximum pointer coöperating with the magnet being disk-shaped corresponding with the shape of the magnet but of slightly larger diameter, and the axis on which said pointer revolves passing through the centers of said disk and magnet.

In testimony whereof I have hereunto set my hand in presence of two subscribing witnesses.

EDOUARD SEIGNOL.

Witnesses:
 LOUIS JORN,
 LINKE KLOTZ.